US008303148B2

(12) United States Patent

Frey et al.

(10) Patent No.: US 8,303,148 B2

(45) Date of Patent: Nov. 6, 2012

(54) ILLUMINATION UNIT FOR VEHICLE HEADLIGHTS, AND VEHICLE HEADLIGHT

(75) Inventors: Peter Frey, Heidenheim (DE); Ralf Vollmer, Ulm (DE)

(73) Assignee: Osram Gesellschaft mit beschrankter Haftung, Munich (DE)

( * ) Notice: Subject to any disclaimer, the term of this patent is extended or adjusted under 35 U.S.C. 154(b) by 477 days.

(21) Appl. No.: 12/516,706

(22) PCT Filed: Nov. 21, 2007

(86) PCT No.: PCT/EP2007/062650

§ 371 (c)(1), (2), (4) Date: May 28, 2009

(87) PCT Pub. No.: WO2008/065030

PCT Pub. Date: Jun. 5, 2008

(65) Prior Publication Data

US 2010/0067248 A1 Mar. 18, 2010

(30) Foreign Application Priority Data

Nov. 28, 2006 (DE) ..................... 20 2006 018 081 U

(51) Int. Cl.
*B60Q 1/04* (2006.01)

(52) U.S. Cl. ......................... 362/548; 362/549; 362/368

(58) Field of Classification Search .................. 362/548, 362/549, 647, 652, 655, 656, 368, 457
See application file for complete search history.

(56) References Cited

U.S. PATENT DOCUMENTS 5,823,654 A * 10/1998 Pastrick et al. ............... 362/494
7,621,667 B2 * 11/2009 Behr et al. .................... 362/651

FOREIGN PATENT DOCUMENTS

| | | |
|---|---|---|
| DE | 200 09 633 | 9/2000 |
| DE | 102005018282 A1 * | 10/2006 |
| EP | 0 600 646 | 11/1993 |
| EP | 1 715 242 | 10/2006 |
| WO | WO 2006/066530 | 6/2006 |
| WO | WO 2006/082537 | 8/2006 |
| WO | WO 2006/097067 | 9/2006 |

* cited by examiner

*Primary Examiner* — Thomas Sember

(74) *Attorney, Agent, or Firm* — Cozen O'Connor

(57) ABSTRACT

An illumination unit having at least one light emitting diode chip and a housing (100) that at least partially surrounds the at least one light emitting diode chip (3), the housing (100) having fastening means for mounting the illumination unit in a luminaire, wherein the fastening means comprise at least one projection or one depression (122; 102) that is arranged on the housing (100) and, in order to mount the illumination unit in the luminaire, cooperates with a counterpart (210; 203'), coordinated in an accurately fitting fashion therewith, on a luminaire part (200; 200', 200") of the luminaire in such a way that the at least one projection or the at least one depression (122; 102) and the counterpart (210; 203') interlock in an accurately fitting fashion.

6 Claims, 8 Drawing Sheets

ILLUMINATION UNIT FOR VEHICLE HEADLIGHTS, AND VEHICLE HEADLIGHT

RELATED APPLICATIONS

This is a U.S. national stage of application No. PCT/EP2007/062650 filed Nov. 21, 2007.

This application claims the priority of German patent application no. 20 2006 018 081.8 filed Nov. 28, 2006, the entire content of which is hereby incorporated by reference.

FIELD OF THE INVENTION

The invention relates to an illumination unit having at least one light emitting diode chip, and a vehicle headlight incorporating such an illumination unit.

I. PRIOR ART

Such an illumination unit and such a vehicle headlight are disclosed, for example, in WO 2006/066530 A1. This laid open patent application describes an illumination unit having at least one light emitting diode chip, a housing, formed as a heat sink, that partially surrounds the at least one light emitting diode chip, and having a holder for fixing the at least one light emitting diode chip with reference to the heat sink in a unique position and alignment, the heat sink being provided with fastening means for mounting the illumination unit in a vehicle headlight. Together with corresponding fastening means on the headlight, the fastening means form a bayonet lock.

II. SUMMARY OF THE INVENTION

It is an object of the invention to provide an illumination unit which is of the generic type and exhibits simplified mounting in the vehicle headlight, and a corresponding vehicle headlight.

This and other objects are attained in accordance with one aspect of the present invention directed to an illumination unit that has at least one light emitting diode chip and a housing at least partially surrounding the at least one light emitting diode chip, the housing having fastening means for mounting the illumination unit in a vehicle headlight. The fastening means comprise at least one projection or one depression that is arranged on the housing and, in order to mount the illumination unit in the luminaire, is provided for the purpose of cooperating with a counterpart, coordinated in an accurately fitting fashion therewith, on a luminaire part, for example on a reflector of the luminaire in such a way that the at least one projection or the at least one depression and the counterpart interlock in an accurately fitting fashion.

The luminaire according to an embodiment of the invention has a reflector and an illumination unit, the illumination unit comprising at least one light emitting diode chip and a housing at least partially surrounding the at least one light emitting diode chip. Moreover, the inventive luminaire has fastening means for mounting the illumination unit on the reflector. The fastening means comprise at least one projection or one depression that is arranged on the housing and that cooperate with a counterpart, coordinated in an accurately fitting fashion therewith, on a luminaire part, for example on a reflector of the luminaire, in such a way that the at least one projection or the at least one depression and the counterpart interlock in an accurately fitting fashion.

An exact alignment of the illumination unit and its at least one light emitting diode chip as well as, if appropriate, of a primary optics, mounted on the at least one light emitting diode chip, with reference to the luminaire part or the reflector and, in particular, with reference to the optical axis of the luminaire or the light reflecting surfaces of the reflector is rendered possible in a simple way by means of the at least one projection or the at least one depression and the counterpart coordinated in an accurately fitting fashion therewith.

The at least one projection or the at least one depression is advantageously equipped on the housing of the illumination unit with a first bore, and the accurately fitting counterpart is equipped on the luminaire part or the reflector of the luminaire with a second bore, said bores serving to produce a connection, preferably a screw connection, between the illumination unit and the luminaire part or reflector.

In accordance with two preferred exemplary embodiments of the invention, the portion, forming the edge of the first bore, of the housing, and the portion, forming the edge of the second bore, of the reflector are formed such that they interlock in an accurately fitting fashion.

An exact alignment of the illumination unit and its at least one light emitting diode chip as well as, if appropriate, of a primary optics, mounted on the at least one light emitting diode chip, with reference to the reflector and, in particular, with reference to the optical axis of the reflector or the light reflecting surfaces of the reflector is rendered possible in a simple way by means of the two abovementioned bores and the edges, interlocking in an accurately fitting fashion, of these bores, since the first and the second bore can be designed very precisely such that only slight tolerances of fractions of a millimeter occur in the case of their position and their diameter. The bores are therefore suitable as a reference for the adjustment of the light emitting diode chip of the illumination unit or the primary optics assigned to it with reference to the light reflecting surfaces of the reflector. The inventive fastening means can, furthermore, be used independently of the form of the electrical connections of the illumination unit. In particular, they are also suitable for illumination units that have electrical connecting cables instead of the contact pins disclosed in the prior art.

The first bore or/and the second bore is/are advantageously formed to be constricted in a stepped fashion in order to ensure the accurately fitting interlocking of the edge regions of the bores in the housing of the illumination unit and of the reflector. In particular, the more constricted portion of the bores can be used to produce a connection, for example a screw connection, between the illumination unit and the reflector, while the second portion of the first or second bore is responsible for the accurately fitting joining of illumination unit and reflector with precise alignment.

The second bore is preferably arranged on the rear side, averted from the light exit opening, of the reflector such that the illumination unit can be mounted on the rear side of the reflector, and the light emitting diode chip, as well as the primary optics, project through a cutout in the reflector. A vignetting of the light by the fastening means for the illumination unit is thereby avoided.

In accordance with an alternative further exemplary embodiment of the invention, the at least one projection or the at least one depression is formed by a wall of the housing of the illumination unit, and the accurately fitting counterpart is formed by guide elements that are arranged on the luminaire part, in particular on the reflector, and are in contact with the wall. It is thereby likewise possible in a simple way to render possible an exact alignment of the illumination unit and its at least one light emitting diode chip as well as, if appropriate, of a primary optics, mounted on the at least one light emitting diode chip, with reference to the luminaire part or the reflector and, in particular, with reference to the optical axis of the luminaire or the surfaces of the reflector that reflect the light.

The fastening means of the inventive illumination unit advantageously have at least two projections or depressions that are arranged on the housing and, in order to mount the illumination unit in the luminaire, are provided for the purpose of cooperating with counterparts, coordinated in an accurately fitting fashion therewith, on a luminaire part of the luminaire in such a way that the projections or the depressions and the counterparts interlock in an accurately fitting fashion. As a result of this, an unmistakable installation position of the illumination unit is ensured and, in particular, a rotary movement is prevented.

BRIEF DESCRIPTION OF THE DRAWINGS

The invention is explained in more detail below with the aid of preferred exemplary embodiments. In the drawings.

DETAILED DESCRIPTION OF THE DRAWINGS

Figure 4:
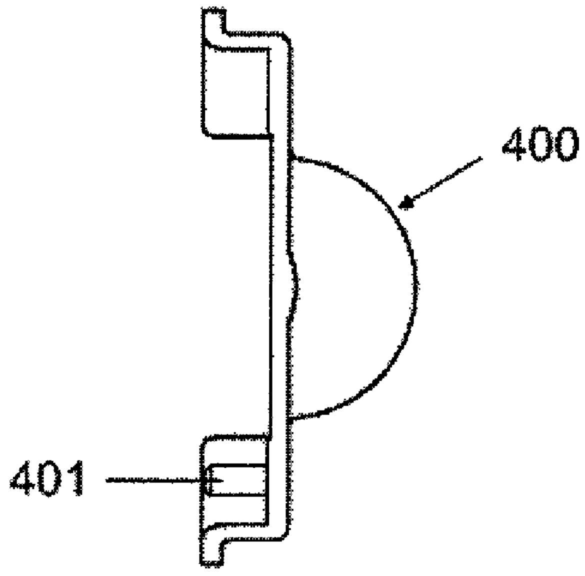
FIG. 4 shows a side view of the primary optics or cover of the illumination unit illustrated in FIG. 1.
Figure 5:
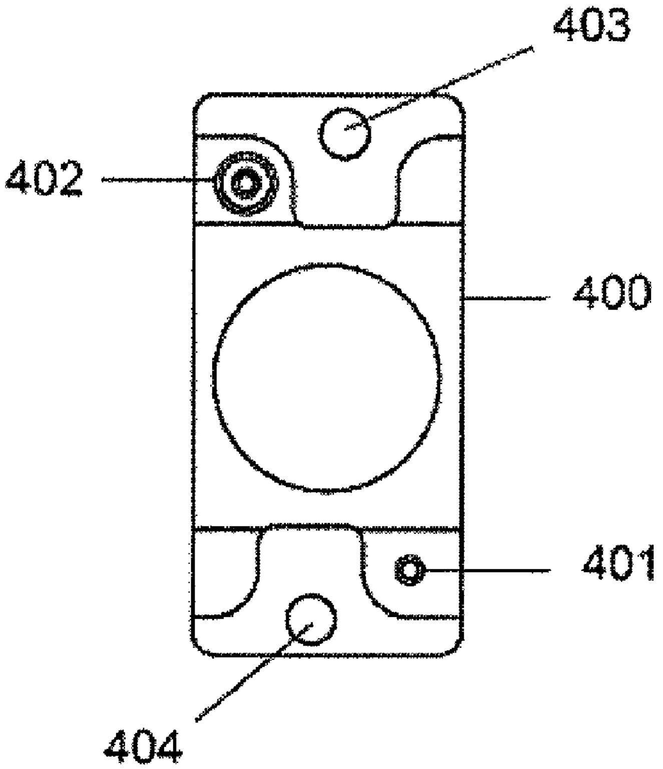
FIG. 5 shows a plan view of the primary optics or cover illustrated in FIG. 4.
Figure 6:
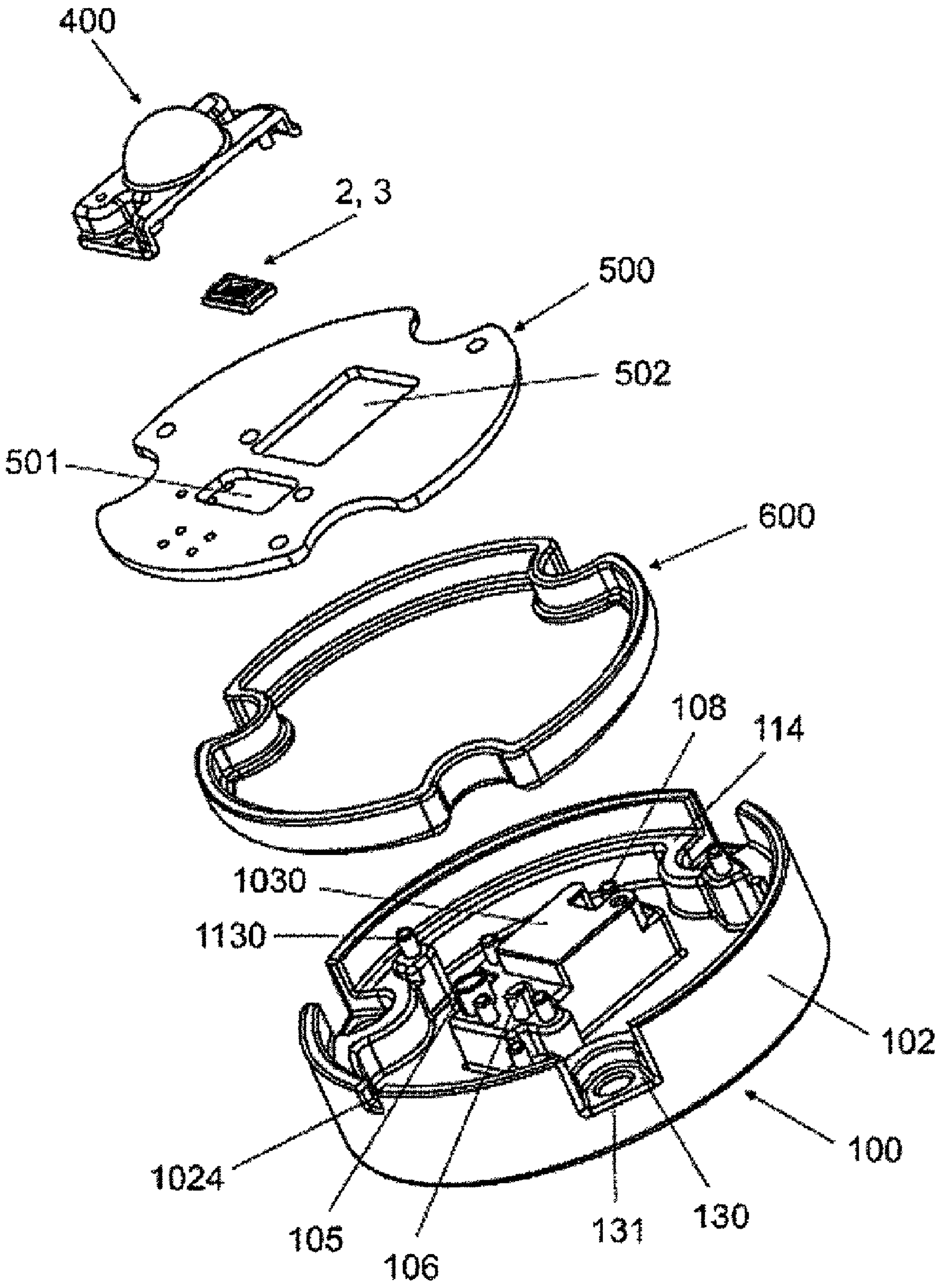
FIG. 6 shows an illustration of all the components of the illumination unit in accordance with the first exemplary embodiment illustrated in FIGS. 1, 2, 4 and 5.
Figure 7:
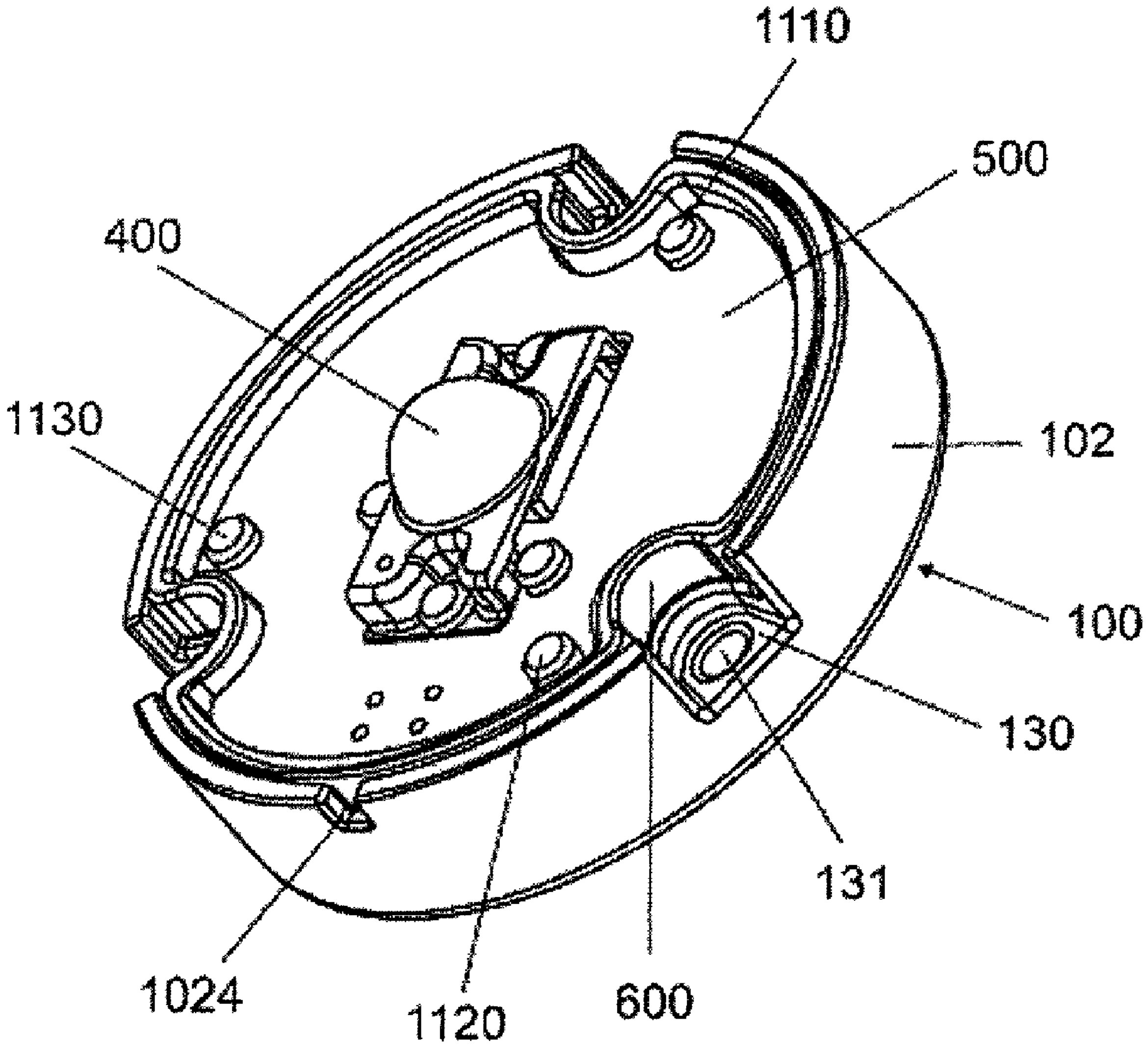
FIG. 7 shows an illustration of the illumination unit illustrated in FIG. 6 in the mounted state of all the components.

The illumination unit in accordance with the preferred exemplary embodiments of the invention comprises a potlike, substantially cylindrically symmetrical housing 100 made from aluminum and having a bottom 101 of the type of a circular disk, and a side wall 102 that is integrally formed on the bottom 101 and runs along the lateral surface of a cylinder. The housing 100 is formed, in particular, as an aluminum die cast part. On its inside, the bottom 101 of the housing 100 has an elevation 103 that is formed in unipartite fashion with the bottom 101 and has a high middle portion 1030 and two lower lying plateaus 1031, 1032. The top side of the middle portion 1030 has a greater height over the bottom 101 of the housing 100 than the two plateaus 1031, 1032 arranged on different sides of the middle portion. The top side of the middle portion forms a support surface for a carrier plate 2 made from ceramic, which serves as the carrier for five light emitting diode chips 3, and for a primary optics 400. The carrier plate 2 ensures an electrical insulation between the metallic housing 100, in particular the elevation 103, and the light emitting diode chips 3. The five light emitting diode chips 3 are arranged on the carrier plate 2 in a row and surrounded by the walls of a frame. The light emitting diode chips 3 emit blue light and are provided with a fluorescent coating (chip layer coating) in order to convert the wavelength of a fraction of the electromagnetic radiation generated by the light emitting diode chips 3 such that the illumination unit emits light of white appearance during its operation. The light emitting diode chips 3 are, for example, thin film light emitting diode chips whose basic principle is described, for example, in the publication I. Schnitzer et al., Appl. Phys. Lett. 63 (16), Oct. 18, 1993, 2174-2176. The carrier plate 2 is bonded with the aid of an automatic placement machine on the top side of the middle portion 1030 of the elevation 103 at a prescribed spacing and with a well defined orientation with reference to a hollow cylindrical web 105, arranged on the first plateau 1031, and an elongated hole 104 arranged on the second plateau 1032. The carrier plate 2 with the light emitting diode chips 3 arranged thereon is arranged between the elongated hole 104 and the hollow cylindrical web 105. The elongated hole 104 and the hollow cylindrical web 105 serve to align a domelike primary optics 400 (FIGS. 4 and 5) that is placed over the light emitting diode chips 3, such that the light emitted by the light emitting diode chips 3 or the light emitting diodes is coupled into the primary optics 400. In the simplest case, the primary optics 400 is a transparent, domelike cover for the light emitting diode chips 3. The primary optics 400 has two webs 401, 402 which engage in the elongated hole 104 and the hollow cylindrical web 105 in an accurately fitting fashion. The top side or the end of the hollow cylindrical web 105 serves as support surface for the primary optics 400. A further support surface for the primary optics 400 is formed by a web 106 of oval cross section that is arranged on the first plateau 1031 next to the hollow cylindrical web 105 and opposite the elongated hole 104. The top side of the cylindrical hollow web 105 and of the web 106 of oval cross section are the same height above the housing bottom 101 as the top side of the middle portion 1030. Furthermore, there are arranged on the first 1031 and second plateau 1032 two mutually opposite pins 107, 108 that engage in cutouts 403, 404 at the edge of the primary optics 400 in order to fix the latter on the housing 100. In the region of the first plateau 1031, the elevation 103 has two, lobe-like integral extensions 109, 110, each respectively having a pin 1090, 1100, which are arranged on different sides of the plateau 1031. The pins 1090, 1100 serve to rivet a mounting board 500 that rests on the top side of the first 1031 and the second plateau 1032 as well as on three further support surfaces 111, 112, 113, respectively provided with a pin 1110, 1120, 1130. The abovenamed support surfaces 111, 112, 113 are arranged equidistantly along the inside of an annular web 114 running on the inside of the side wall 102. The mounting board 500 (FIG. 6) has two substantially rectangular cutouts 501, 502, through which the middle portion 1030 and the webs 105, 106 as well as the pins 107, 108 project. The components of an operating device for the light emitting diode chips 3 are mounted on the mounting board. In particular, the operating device comprises a driver circuit supplying power to the light emitting diode chips 3, and a voltage transformer for supplying power to the driver circuit from the on-board network voltage of the motor vehicle. The edge of the mounting board 500, which is virtually in the shape of a circular disk, terminates at the inside of the annular support surface 114 for the sealing ring 600 such that the mounting board 500 and the housing bottom 101 as well as the annular web 114 or the sealing ring 600 lying thereupon form an interior. In addition to the lobe-like integral extension 109 and the hollow cylindrical web 105, there is formed in the elevation 103 a tub 115 that is filled with a thermally conducting paste. Arranged on the tub 115 is a temperature dependent resistance (not illustrated), in particular a so called NTC (resistance with a negative temperature characteristic), which is in contact with the thermally conducting paste and serves as temperature sensor in order to measure the operating temperature of the light emitting diode chips 3. The side wall 102 has three recesses 1021, 1022, 1023 that are arranged along the circumference of the housing 100 and in which there is respectively arranged a surface 120, 130, 140 running parallel to the housing bottom 101. These surfaces 120, 130, 140 are at the same level above the housing bottom 101, and are respectively bounded by an indentation 1141, 1142, 1143 which is, directed into the interior of the housing 100, of the annular web 114. Arranged in the first surface 120 is a continuous bore 121 that is constricted in a stepped fashion in the direction of the housing bottom 101 and reaches from the surface 120 as far as the outside of the housing bottom 101. The bore 121 is designed in such a way that there is arranged in the surface 120 a circular cylindrical depression 122 whose outside radius corresponds to the first, large radius of the bore 121, and whose inside radius corresponds to the second, small radius of the bore. The depth of the bore 121 is only a few millimeters in the region of the first, large radius, while the region of the bore 121 in the region of the second, small radius reaches from the bottom of the depression 122 up to the outside of the housing bottom 101. That is to say, the level of the bottom of the depression 122 above the housing bottom 101 is only a few millimeters less than the level of the surfaces 120, 130, 140 above the housing bottom 101. Likewise respectively arranged in the other two surfaces 130, 140 are continuous bores 131, 141 whose radius respectively corresponds to the radius of the narrow region of the first bore 121. Arranged in the housing bottom 101 are, furthermore, two cutouts 150 that serve to guide through electrical connecting cables for the power supply of the components, mounted on the mounting board, of the operating device. Moreover, the housing bottom 101 preferably has three further bores for fastening a heat sink (not illustrated).

Figure 1:
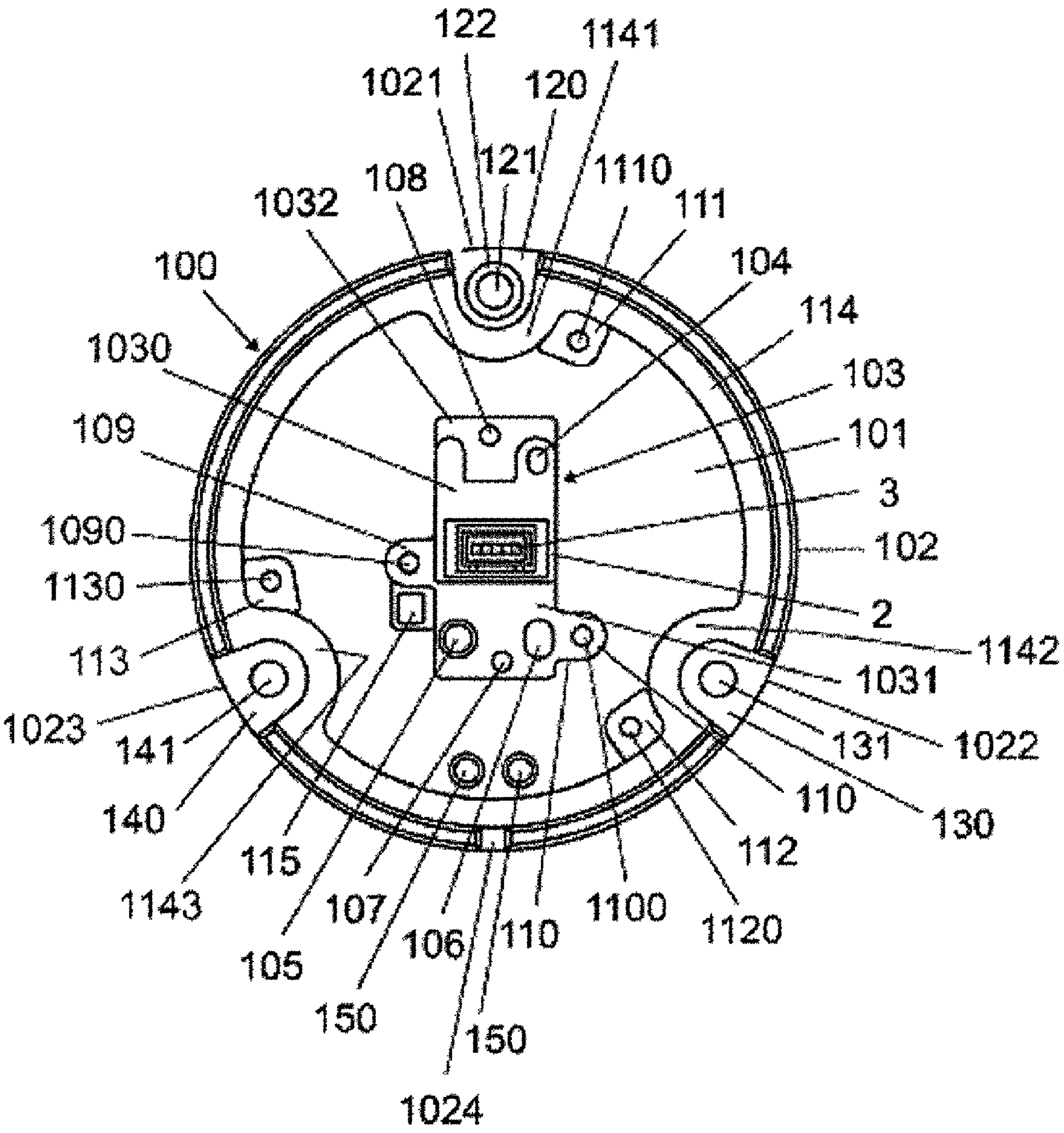
FIG. 1 shows a plan view of an illumination unit in accordance with the preferred exemplary embodiment of the invention, in a schematic illustration.
Figure 2:
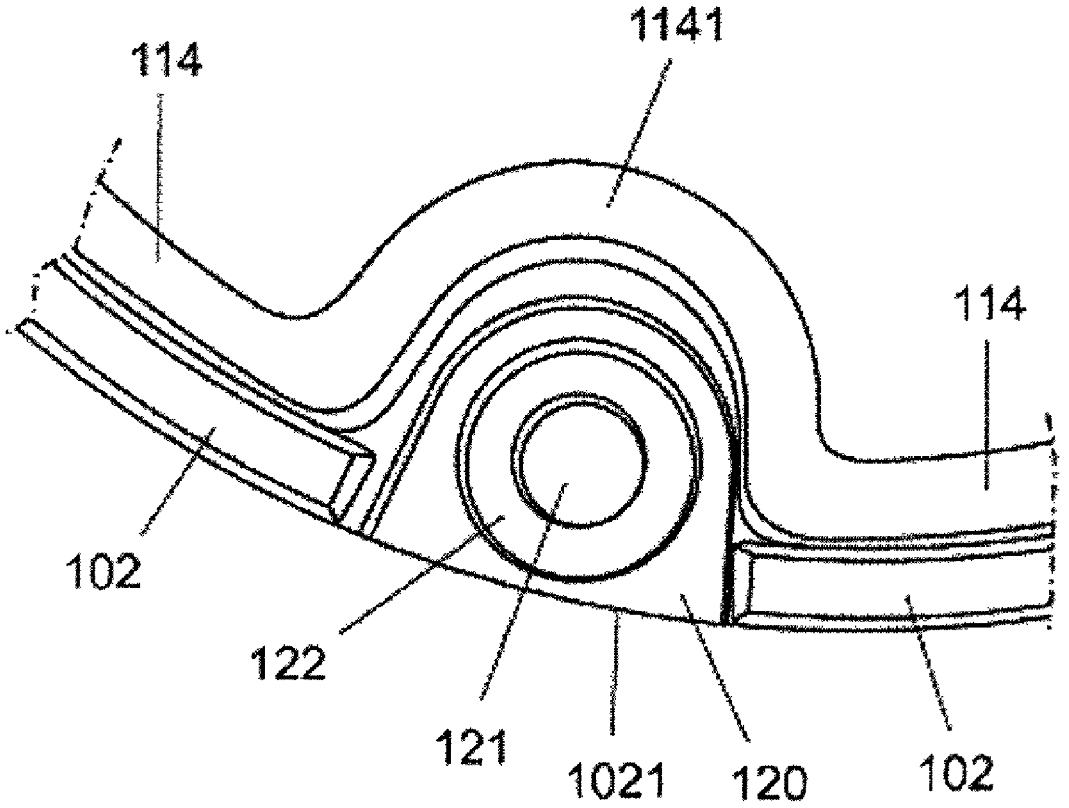
FIG. 2 shows a plan view of the constricted bore of the illumination unit illustrated in FIG. 1.
Figure 3:
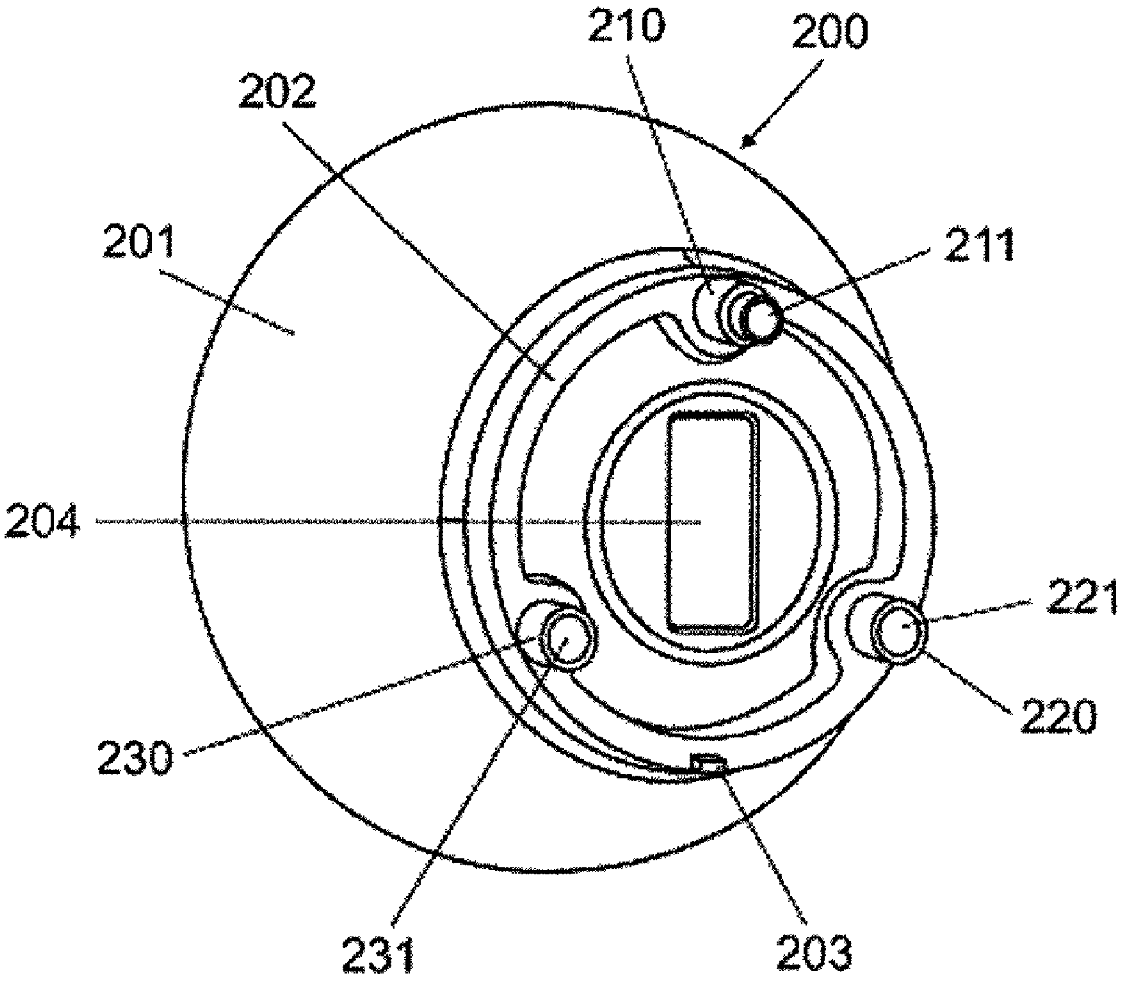
FIG. 3 shows a plan view of the rear side of a vehicle headlight in accordance with the first exemplary embodiment of the inventive luminaire, before the mounting of the illumination unit illustrated in FIG. 1.

The depression 122 is provided for the accommodation of a hollow web 210 that is coordinated in an accurately fitting fashion therewith and integrally formed on the rear side 201 of the reflector 200, illustrated in FIG. 3, of the vehicle headlight. The outside diameter of this hollow web 210 is coordinated with the first, large radius of the bore 121, that is to say the radius of the depression 122. Arranged in the hollow web 210 is a bore hole 211 whose radius is identical to the second, small radius of the bore 121 and which serves to screw the housing 100 of the illumination unit to the reflector 200. The screwing is performed from the outside of the housing bottom 101, the screw being inserted on the outside or rear side of the bottom 101 into the constricted region of the bore 121, and owing to the screwing operation, finally penetrating into the bore hole 211, arranged coaxially with the narrow region of the bore 121, of the hollow web 210. The hollow web 210 therefore engages in the wider region 122 of the bore 121 in an accurately fitting fashion such that the position of the hollow web 210 and of the stepped bore 121 can serve as a reference for the alignment of the illumination unit or the light emitting diode chips 3 with reference to the reflector 200. On its rear side 201, the reflector 200 has an annular flange 202 whose dimensions are coordinated with the annular web 114 of the illumination unit. Lying on the annular web 114 is a sealing ring 600 made from rubber or silicone that, after the mounting of the illumination unit, bears against the annular flange 202 with a clamping fit. That is to say, after the mounting of the illumination unit in the vehicle headlight, the sealing ring is arranged between the annular flange 202 of the reflector 200 and the annular web 114 of the illumination unit. Arranged on the annular flange 202 are two further hollow webs 220, 230 that are respectively provided with a bore hole 221, 231 and are aligned for the purpose of mounting the illumination unit such that the bore holes 221 and 231, respectively, are arranged coaxially with the bores 131 and 141, respectively, in order in each case to be able to insert a screw into the bores 131 and 141 and the bore holes 221 and 231 from the outside or rear side of the housing bottom 101. That is to say, the heads of the screws plugging the bores 121, 131, 141 bear against the outside or rear side of the housing bottom 101 and their tips extend as far as into the bore holes 211, 221, 231 of the corresponding hollow webs 210, 220, 230, in order to produce a screw connection between the housing 100 of the illumination unit and the reflector 200 by means of these screws. The first hollow web 210 is of longer design than the other two hollow webs 220, 230 and has a stepped end portion with reduced outside diameter, because it engages in an accurately fitting fashion in the depression 122 in the surface 120. Integrally formed on the annular flange 202 is a pin 203 that engages in a groove 1024 in the side wall 102 of the housing 100 of the illumination unit. The pin 203 lies diametrically opposite the first hollow web 210. Similarly, the groove 1024 lies diametrically opposite the support surface 120. Together with the first hollow web 210 and the steplike bore 121, the groove 1024 and the pin 203 prevent rotation of the illumination unit about its axis of symmetry.

Arranged in the rear wall 201 of the reflector 200 is a substantially rectangular cutout 204 through which the light emitting diode chips 3 and the primary optics 400 mounted thereon project after the mounting of the illumination unit such that the light emitted by the light emitting diode chips 3 impinges on the light reflecting surfaces of the reflector 200 after passing through the primary optics 400.

The reflector 200, with the illumination unit mounted on it, is a component of a vehicle headlight, preferably a fog light headlight or a headlight for daytime running light or else for a high beam or dimmed headlight.

Figure 8:
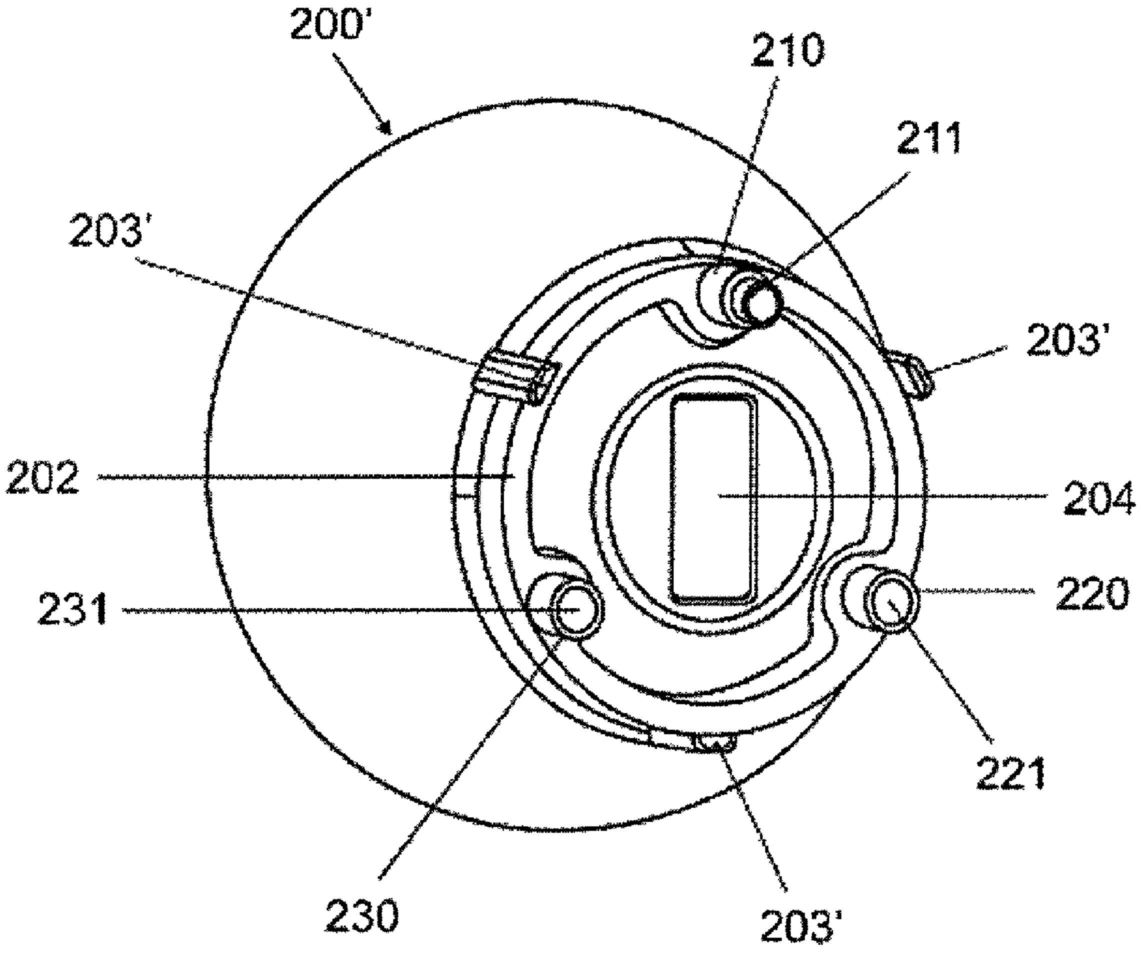
FIG. 8 shows a plan view of the rear side of a vehicle headlight in accordance with the second exemplary embodiment of the inventive luminaire, before the mounting of the illumination unit illustrated in FIG. 7.

Illustrated in FIG. 8 is a second exemplary embodiment of a reflector 200' that can be used instead of the reflector 200 illustrated in FIG. 3 together with the illumination unit illustrated in FIGS. 1, 2, 4, 5, 6 and 7 in order to form an inventive vehicle headlight. The reflector 200' illustrated in FIG. 8 differs from the reflector 200 illustrated in FIG. 3 only in that it has three webs 203' that are arranged equi-distantly along the outer circumference of the annular flange 202 and extend parallel to the axis of annulus of the flange 202 and bear against the outside of the wall 102 of the housing 100 of the illumination unit. Instead of the pin 203 in accordance with the reflector 200 of the first exemplary embodiment illustrated in FIG. 3, they serve as further guide elements for the exact alignment of the reflector 200' and illumination unit.

Figure 9:
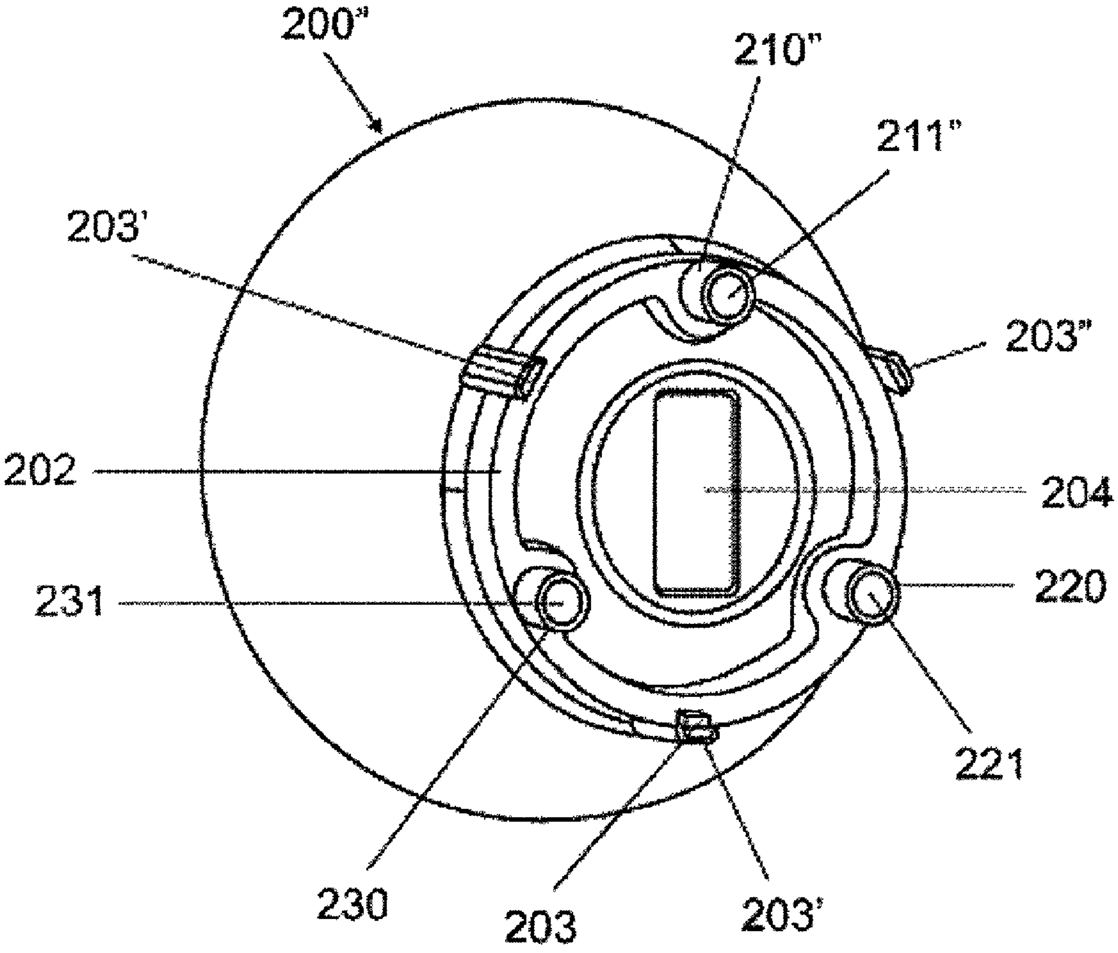
FIG. 9 shows a plan view of the rear side of a vehicle headlight in accordance with the third exemplary embodiment of the inventive luminaire, before the mounting of the illumination unit illustrated in FIG. 7.

Illustrated in FIG. 9 is a third exemplary embodiment of a reflector 200" that, instead of the reflector 200 illustrated in FIG. 3 or instead of the reflector 200' illustrated in FIG. 8, can be used together with the illumination unit illustrated in FIGS. 1, 2, 4, 5, 6 and 7 in order to form an inventive vehicle headlight. The reflector 200" illustrated in FIG. 9 differs from the reflector 200' illustrated in FIG. 8 only in that it has three uniform hollow webs 210", 220, 230 for the screw connection of illumination unit and reflector, and in that the lengthened hollow web 210 with the end section of reduced outside diameter has been dispensed with. The alignment of illumination unit and reflector 200" is ensured here only by the accurately fitting interlocking of the three webs 210", 220, 230 and the wall 102 of the housing 100 of the illumination unit, and with the aid of the pin 203 that, as in the case of the exemplary embodiment illustrated in FIG. 3, serves to engage in the groove 1024 of the wall 102 of the housing 100 of the illumination unit. A connection between the illumination unit and the reflector 200" is produced by means of screws that are inserted into the bores 121, 122, 123 and into the hollow webs 210", 220, 230.

The invention is not limited to the exemplary embodiments explained in more detail above. For example, a cooling device which can, for example, consist of cooling ribs or is designed as a heat sink, can be fitted on the outside or the rear side of the housing bottom 101.

The invention claimed is:

1. A luminaire comprising:

an illumination unit, the illumination unit comprising:

at least one light emitting diode chip; and a housing that at least partially surrounds the at least one light emitting diode chip and is provided with fastening means for mounting the illumination unit on a luminaire part;

wherein the fastening means comprise a projection or a depression that is arranged at a circumference on the housing and cooperates with a counterpart, coordinated in an accurately fitting manner therewith, on the luminaire part of the luminaire such that the projection or the depression and the counterpart interlock in an accurately fitting manner;

wherein said projection or depression includes a first bore, and the accurately fitting counterpart includes a second bore, said first and second bores being coaxially aligned for mounting the illumination unit on the luminaire part, and at least one of said first and second bores being constricted in a stepped manner; and wherein said first and said second bores are formed as a component of a screw connection between the illumination unit and the luminaire part.

2. The luminaire as claimed in claim 1, wherein a portion of the projection or the depression, forming an edge of the first bore of the housing, and the portion forming an edge of the second bore of the luminaire part interlock in the accurately fitting manner.

3. The luminaire as claimed in claim 1, wherein the second bore is arranged on a rear side, averted from a light exit opening, of the luminaire part.

4. The luminaire as claimed in claim 1, wherein the projection or the depression is formed by a wall of the housing, and the accurately fitting counterpart is formed by guiding elements, arranged on the luminaire part, which are in contact with the wall.

5. The luminaire as claimed in claim 1, wherein the fastening means comprise at least two projections or depressions that are arranged at the circumference on the housing and cooperate with counterparts, coordinated in the accurately fitting manner therewith, on the luminaire part of the luminaire such that the at least two projections or depressions and the counterparts interlock in the accurately fitting manner.

6. The luminaire as claimed in claim 1 formed as a vehicle headlight.

* * * * *